United States Patent [19]

Tomikawa

[11] Patent Number: 5,760,528
[45] Date of Patent: Jun. 2, 1998

[54] VIBRATION ACTUATOR

[75] Inventor: Yoshiro Tomikawa, Yonezawa, Japan

[73] Assignee: Nikon Corporation, Tokyo, Japan

[21] Appl. No.: 626,325

[22] Filed: Apr. 2, 1996

[30] Foreign Application Priority Data

Apr. 7, 1995 [JP] Japan ................... 7-082543

[51] Int. Cl.$^6$ ................ H02N 2/00; H01L 41/08
[52] U.S. Cl. ................................................ 310/323
[58] Field of Search .......................... 310/323, 328, 310/367, 368, 316, 317

[56] References Cited

U.S. PATENT DOCUMENTS

| 4,398,116 | 8/1983 | Lewis | 310/334 |
|---|---|---|---|
| 4,742,260 | 5/1988 | Shimizu et al. | 310/323 |
| 4,814,660 | 3/1989 | Yamada et al. | 310/328 |
| 4,953,413 | 9/1990 | Iwata et al. | 74/1 SS |
| 5,132,582 | 7/1992 | Hayashi et al. | 310/323 |
| 5,146,129 | 9/1992 | Tamura et al. | 310/323 |
| 5,176,376 | 1/1993 | Igaki et al. | 310/323 |
| 5,200,665 | 4/1993 | Iijima | 310/323 |
| 5,418,418 | 5/1995 | Hirano et al. | 310/328 |
| 5,508,579 | 4/1996 | Suganuma | 310/316 |

FOREIGN PATENT DOCUMENTS

| 0 253 375 | 1/1988 | European Pat. Off. | H01L 41/08 |
|---|---|---|---|
| 0 691 692 | 1/1996 | European Pat. Off. | H01L 41/09 |
| 62-152380 | 7/1987 | Japan | 310/328 |
| 63-277477 | 11/1988 | Japan | 310/323 |
| 851565 | 10/1979 | U.S.S.R. | 310/328 |

OTHER PUBLICATIONS

Tomikawa et al., Piezoelectric Linear Motors for Aplication to Driving a Light Pick–Up Element, pp. 393–398, Mar. 1993.

Ueha, S. et al., "Ultrasonic Motors—Theory and Applications", 1993, pp. 188–197, Jun. 9–11, 1993.

Primary Examiner—Thomas M. Dougherty
Attorney, Agent, or Firm—Shapiro and Shapiro

[57] ABSTRACT

An ultrasonic actuator is capable of moving one-dimensionally or two-dimensionally on a flat plane, and can easily be assembled in a cylindrical portion such as a lens barrel of a camera. This ultrasonic actuator comprises a frame-like elastic member having an outer form in a regular square, and electro-mechanical converting elements which are joined to frame side portions of the elastic member for generating vibrations in a longitudinal vibration mode and a bending vibration mode in response to a drive signal so as to generate elliptic motion at predetermined positions in the frame side portions by a synthetic motion of the above-mentioned vibrations. The ultrasonic actuator can translate one-dimensionally or two-dimensionally on the flat plane upon application of a driving voltage onto each group of the opposed electro-mechanical converting elements.

21 Claims, 4 Drawing Sheets

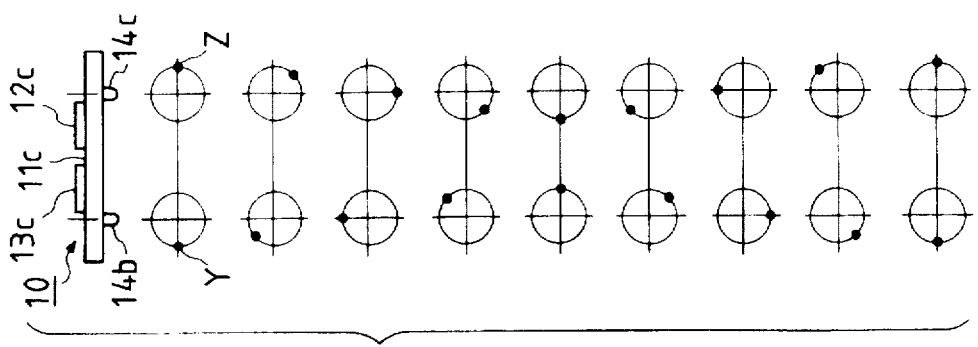
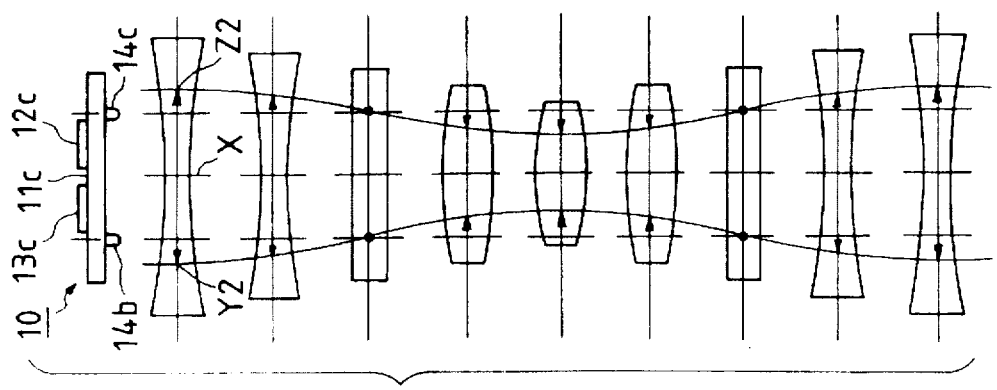
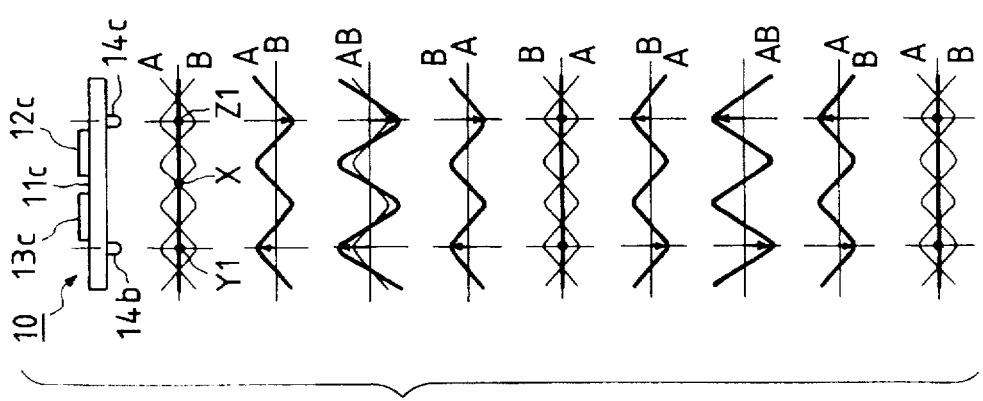
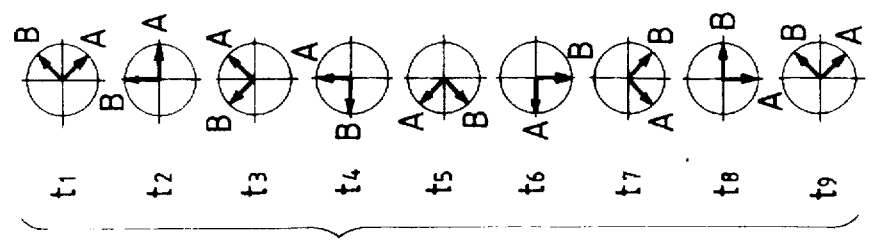

VIBRATION ACTUATOR

BACKGROUND OF THE INVENTION

1. Field of the Invention

The present invention relates to a vibration actuator which is typically represented by an ultrasonic motor. The present invention relates, in particular, to a vibration motor which utilizes elliptic motion caused by synthesizing longitudinal vibration and bending vibration.

2. Related Background Art

Conventionally, a vibration actuator of this type generates a travelling vibration wave in a ring-shaped elastic member by exciting electro-mechanical converting elements, thereby driving a movable member (rotor) as a relative moving member which is in press contact with the elastic member.

Also for a linear vibration actuator, a vibration applying electro-mechanical converting element is disposed on one end portion of a rod-shaped elastic member, and a vibration absorbing electro-mechanical converting element for absorbing reflection of a travelling wave is disposed on the other end portion. With this arrangement, a travelling wave that propagates from one end to the other end of the elastic member is generated, thereby driving a movable member which is in press contact with the elastic member.

The former vibration actuator is assembled in, e.g., a lens barrel of a camera, and is used for driving an AF auto focusing lens upon rotation of the movable member.

Additionally, a blur prevention device for correcting an image blur by moving a portion of a photographing optical system in a plane substantially perpendicular to the optical axis has been proposed. However, the former actuator cannot be applied to this device since its driving direction does not match. Further, the latter actuator cannot be easily assembled in a cylindrical lens barrel and makes the device bulky to attain driving operations in two directions, i.e., the X- and Y-directions in the plane perpendicular to the optical axis.

When an electromagnetic motor, which has high-speed, low-torque features, is to be utilized, a gear train is normally required to assure a high output torque. Furthermore, when an object to be driven is to be moved in two directions in a plane, two independent pairs of electromagnetic motors and gear trains are required to drive the object to be driven in the respective directions. For this reason, the device is made bulky and its weight increases. In addition, a decrease in response, generation of noise, and the like occur due to backlash or the like as an inevitable problem of the gear train.

SUMMARY OF THE INVENTION

An object of the present invention is to provide a vibration actuator which is capable of moving one-dimensionally or two-dimensionally on a flat plane and can be easily assembled in a cylindrical portion such as a lens barrel of a camera.

In order to achieve the above object, according to the present invention, there is provided a vibration actuator comprising an elastic member an outer shape of which is constituted by a polygon having at least one pair of parallel or substantially parallel opposed sides and formed in the shape of a frame, and electro-mechanical converting elements which are joined to the frame side portions of the elastic member containing the parallel sides and which generate the elliptic motion at predetermined positions in the frame side portions by generating vibrations in a longitudinal vibration mode and a bending vibration mode in the frame side portions with a drive signal.

The electro-mechanical converting elements to be joined to the frame side portions can be arranged to be controlled independently of each other.

It is preferable to provide driving force extracting members at predetermined positions in the frame side portions. It is also preferable that each of the driving force extracting members has a curved-face contact portion to a relative moving member.

It is possible to form the above-mentioned polygon in the shape of a regular square and to set the above-mentioned predetermined positions in the vicinities of the apexes of the regular square. It is also possible to form the polygon in the shape of a regular hexagon and to set the predetermined positions in the vicinities of the apexes of the regular hexagon.

According to the vibration actuator of the present invention, the electro-mechanical converting elements are driven in response to a drive signal to generate vibrations in the longitudinal vibration mode and the bending vibration mode in the frame side portions of the elastic member, and the elliptic motion is generated at the predetermined positions in the frame side portions due to degeneration of the vibrations. As a result, it becomes possible for the vibration actuator to move one-dimensionally or two-dimensionally on the flat plane parallel to the elastic member.

BRIEF DESCRIPTION OF THE DRAWINGS

FIGS. 3A to 3D are charts for explaining an operation of the vibration actuator according to the first embodiment;

DESCRIPTION OF THE PREFERRED EMBODIMENTS (First Embodiment)

An embodiment of the present invention will be described more fully in the following with reference to the attached drawings.

Figure 1:
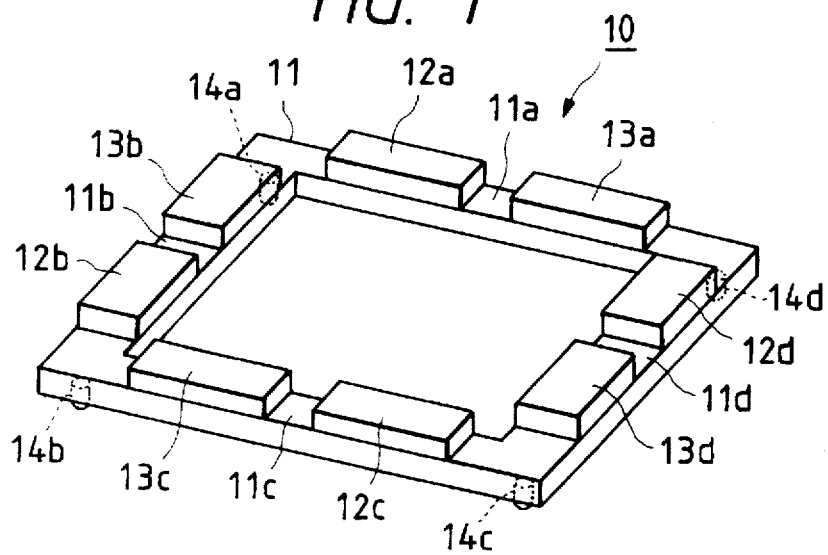
FIG. 1 is a perspective view showing the whole constitution of a vibration actuator according to a first embodiment of the present invention.
Figure 2A:
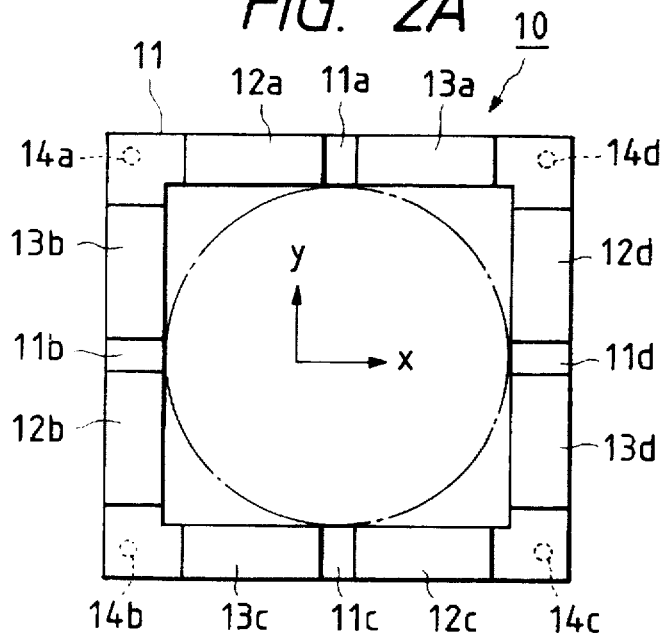
FIGS. 2A to 2C show three sides of the vibration actuator in FIG. 1.
Figure 2C:
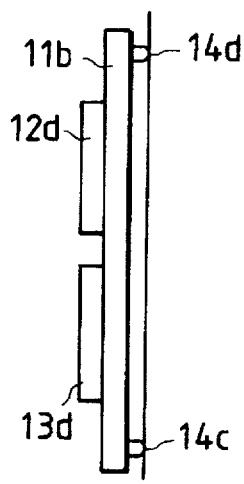
Figure 2B:
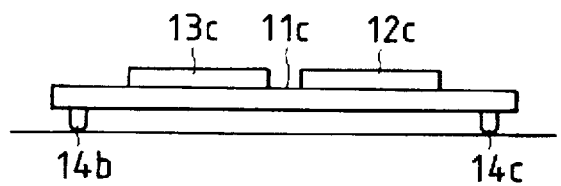
Figure 4:
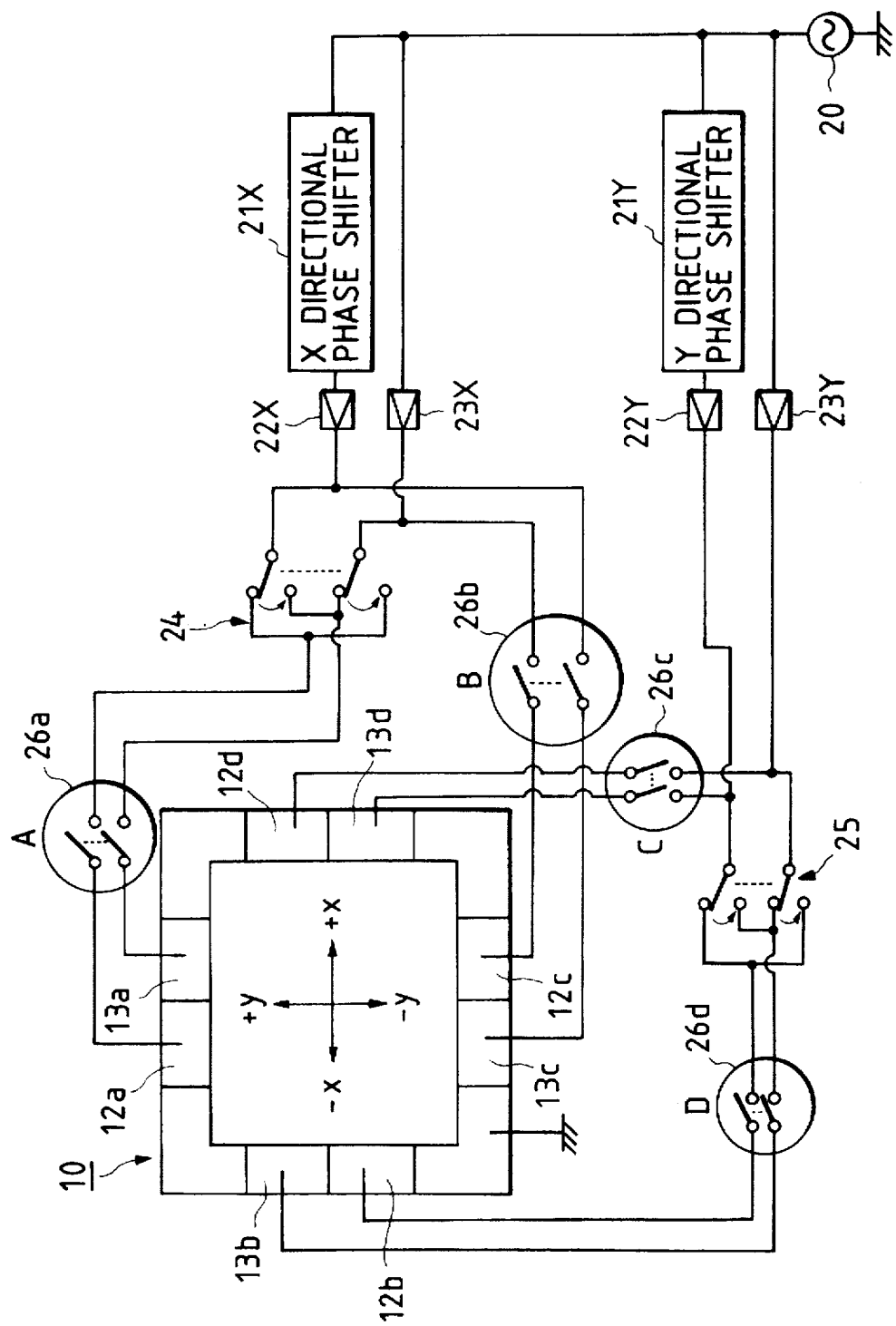
FIG. 4 is a block diagram showing control of each electro-mechanical converting member.

FIGS. 1 to 4 are views showing the first embodiment of a vibration actuator according to the present invention. FIG. 1 is a perspective view for showing the whole constitution of the vibration actuator of the present embodiment. FIGS. 2A to 2C are views for showing three sides of the vibration actuator shown in FIG. 1. FIGS. 3A to 3D are charts for explaining an operation of the vibration actuator of the present embodiment. Further, FIG. 4 is a block diagram for showing the control effected on each electro-mechanical converting member.

As shown in FIG. 1 and FIGS. 2A to 2C, the vibration actuator 10 in the present embodiment is constituted by an elastic member 11 which is formed in the shape of a frame having an outer form constituted by a regular square, pairs of piezoelectric elements 12a and 13a, 12b and 13b, 12c and 13c, and 12d and 13d which function as electro-mechanical converting members to be joined to the upper planes of the four frame side portions 11a, 11b, 11c and 11d of the elastic member 11, and driving force extracting members 14a, 14b, 14c and 14d disposed in the vicinities of the lower plane of the elastic member 11.

The elastic member of the present embodiment is formed in the shape of a frame the outer form of which is a regular square, and is made of metallic or plastic elastic material. Since being formed in the shape of a frame, the elastic member 11 can easily be assembled in, for example, a lens barrel, and if the lens barrel is assembled to be accommodated within the apparatus, the size of the whole apparatus can be reduced to the minimum. It is noted that in FIG. 2A a position at which the lens barrel is assembled is shown by the dotted chain line.

In this elastic member 11, vibrations in the longitudinal vibration mode and the bending vibration mode are generated upon applying of a driving voltage onto the pairs of piezoelectric elements 12a and 13a, 12b and 13b, 12c and 13c, and 12d and 13d functioning as the electro-mechanical converting members. Then, since a synthetic motion of these vibrations generates an elliptic motion, it is important to make the longitudinal vibration mode coincident with the bending vibration mode as much as possible.

To this end, it is important to analyze vibration modes and resonance frequencies which are generated in the frame side portions 11a to 11d of the elastic member 11 so as to set the size of the elastic member 11.

To the four frame side portions 11a, 11b, 11c and 11d of the elastic member 11, the paired piezoelectric elements 12a and 13a, 12b and 13b, 12c and 13c, and 12d and 13d are respectively attached, in the present embodiment, by bonding. Each of these piezoelectric elements is formed into the shape of a thin plate by PZT, or the like.

The pairs of piezoelectric elements 12a and 13a, 12b and 13b, 12c and 13c, and 12d and 13d which are respectively adjacent in the frame side portions 11a to 11d are arranged to be separated from each other with a predetermined distance therebetween. Each of the pairs of piezoelectric elements 12a and 13a, 12b and 13b, 12c and 13c, and 12d and 13d which are respectively adjacent in the frame side portions 11a to 11d is polarized. Then, two input voltages A and B having a phase difference of $\pi/2$ therebetween are applied onto the adjacent piezoelectric elements, respectively.

The paired adjacent piezoelectric elements 12a and 13a, 12b and 13b, 12c and 13c, and 12d and 13d are polarized to have the polarity in the same direction. The high-frequency voltages A and B have a phase difference of the $\pi/2$ therebetween. Note that the polarities of each of the paired adjacent piezoelectric elements 12a and 13a, 12b and 13b, 12c and 13c, and 12d and 13d are opposite to each other.

The driving force extracting members 14a, 14b, 14c and 14d are portions for extracting the elliptic motion which is generated by the synthetic vibration of the longitudinal vibration and the bending vibration of the elastic member 11. These driving force extracting members 14a to 14d make relative motion while contacting to a fixing member (a relative moving member) in pressure. The driving force extracting members 14a to 14d are disposed on the lower face of the elastic member 11 in the vicinities of the apexes of the regular square. These positions in the vicinities of the apexes should be kept away from the node positions of the longitudinal vibration which is generated in the elastic member 11 in order to extract the driving force efficiently. In the present embodiment, they are positioned at the antinodes of the vertical vibration in a substantially vertical direction with respect to a plane of movement, which vibration is generated in the bending vibration mode.

In the present embodiment, the driving force extracting members 14a to 14d are made of silicon nitride in order to improve its abrasion-proof capability, and is made to have a curved-face tip end which serves as a contact portion so as not to impede the elliptic motion as far as possible. To this end, a decrease in the driving force due to the contact with the relative moving member is suppressed as much as possible so that the driving force can be extracted efficiently.

In FIG. 3A, changes with time of the two high-frequency voltages A and B which are supplied to the vibration actuator 10 are indicated as $t_1$ to $t_9$. Each transversal axis in FIG. 3A indicates an effective value of the high-frequency voltages A and B. FIG. 3B shows deformations of a cross-section of the vibration actuator 10, and indicates changes with time ($t_1$ to $t_9$) in the bending vibration which is generated in the vibration actuator 10. FIG. 3C shows deformations of the cross-section of the vibration actuator 10, and indicates changes with time ($t_1$ to $t_9$) in the extending and contracting vibrations which is generated in the vibration actuator 10. FIG. 3D shows changes with time ($t_1$ to $t_9$) in the elliptic motion which is generated in the driving force extracting members 14b and 14c of the vibration actuator 10.

Next, an operation of the vibration actuator 10 of the present embodiment will be described for each change with time ($t_1$ to $t_9$). It is noted that when a driving voltage is applied onto the piezoelectric elements 12a and 13a, 12b and 13b, 12c and 13c, and 12d and 13d which are disposed in the respective frame side portions 11a to 11d independently of each other, the frame side portions 11a to 11d are deformed in the entirely same way. Therefore, description will be made on the frame side portion 11d as an example with reference to FIGS. 3A to 3D.

At the time $t_1$, the high-frequency voltage A generates a positive voltage, while the high-frequency voltage B generates the same positive voltage in the same manner, as shown in FIG. 3A. As shown in FIG. 3B, the bending motions caused by the high-frequency voltages A and B are mutually negated so that the material particles Y1 and Z1 have the amplitude of zero. Also, as shown in FIG. 3C, the expanding and contracting vibrations caused by the high-frequency voltages are generated in the direction of expansion. The material particles Y2 and Z2 show, as indicated by the arrows in the figure, the maximum expansion around the node X. As a result, as shown in FIG. 3D, the both vibrations mentioned above are compounded so that composition of motions of the material particles Y1 and Y2 makes a motion of the material particle Y and composition of motions of the material particles Z1 and Z2 makes a motion of the material particle Z.

At the time $t_2$, the high-frequency voltage B becomes zero and the high-frequency voltage A generates a positive voltage, as shown in FIG. 3A. As shown in FIG. 3B, a bending motion is generated by the high-frequency voltage A, and the material particle Y1 is amplified in the negative direction, while the material particle Z1 is amplified in the positive direction. Also, as shown in FIG. 3C, expanding and contracting vibrations are generated by the high-frequency voltage A so that the material particle Y2 and the material particle Z2 are contracted, compared with those at the time $t_1$. As a result, as shown in FIG. 3D, the both vibrations mentioned above are composited so that the material particles Y and Z advance in a clockwise direction, compared with those at the time $t_1$.

At the time $t_3$, the high-frequency voltage A generates a positive voltage and the high-frequency voltage B generates the same negative voltage in the same manner, as shown in FIG. 3A. As shown in FIG. 3B, bending motions caused by the high-frequency voltages A and B are synthesized and amplified, and the material particle Y1 is amplified in the negative direction, compared with that at the time $t_2$, thereby indicating the maximum negative value of amplitude. The material particle Z1 is amplified in the positive direction, compared with that at the time $t_2$, thereby indicating the maximum positive value of amplitude. Also, as shown in FIG. 3C, the expanding and contracting vibrations generated by the high-frequency voltages A and B are mutually negated so that the material particles Y2 and Z2 return to their original positions. As a result, as shown in FIG. 3D, the both vibrations mentioned above are composited so that the material particles Y and Z are moved in a clockwise direction, compared with those at the time $t_2$.

At the time $t_4$, the high-frequency voltage A becomes zero and the high-frequency voltage B generates a negative voltage, as shown in FIG. 3A. As shown in FIG. 3B, a bending motion is generated by the high-frequency voltage B, the amplitude of the material particle Y1 is decreased, compared with that at the time $t_3$, and the amplitude of the material particle Z1 is decreased, compared with that at the time $t_3$. Also, as shown in FIG. 3C, the expanding and contracting vibrations are generated by the high-frequency voltage B so that the material particles Y2 and Z2 are contracted. As a result, as shown in FIG. 3D, the both vibrations mentioned above are composited so that the material particles Y and Z are moved in a clockwise direction, compared with those at the time $t_3$.

At the time $t_5$, the high-frequency voltage A generates a negative voltage and the high-frequency voltage B generates the same negative voltage in the same manner, as shown in FIG. 3A. As shown in FIG. 3B, bending motions caused by the high-frequency voltages A and B are mutually negated so that the amplitudes of the material particles Y1 and Z1 become zero. Also, as shown in FIG. 3C, the expanding and contracting vibrations are generated by the high-frequency voltages A and B in the direction of contraction. The material particles Y2 and Z2 show the maximum contraction around the node X, as indicated by the arrows in the figure. As a result, as shown in FIG. 3D, the both vibrations mentioned above are composited so that the material particles Y and Z are moved in a clockwise direction, compared with those at the time $t_4$.

With the changes at the times $t_6$ through $t_9$, the bending vibration and the expanding and contracting vibrations are generated on the same principle as mentioned above. As a result, as shown in FIG. 3D, the material particles Y and Z are moved in the clockwise direction to make the elliptic motion.

According to the above-mentioned principle, this vibration actuator generates the elliptic motion at the tip ends of the driving force extracting members 14b and 14c so as to generate the driving force. Therefore, when the tip ends of the driving force extracting members 14b and 14c are in press contact with the fixing portion, the elastic member 11 is self-propelled with respect to the fixing portion.

The vibration actuator 10 in the present embodiment is driven by the following two controlling methods (1) and (2).

(1) The high-frequency voltages A and B having a phase difference $\pi/2$ therebetween are applied onto the piezoelectric elements 12a and 13a and the piezoelectric elements 13c and 12c, respectively. Thus, a composite vibration of the bending vibration and the expanding and contracting vibration is caused in each of the frame side portions 11a and 11c, so that the elliptic motion toward the X direction is generated at the tip ends of the driving force extracting members 14a to 14d and the tip ends of the driving force extracting members 14b and 14c.

(2) The high-frequency voltages A and B having a phase difference $\pi/2$ therebetween are applied onto the piezoelectric elements 12b and 13b and the piezoelectric elements 13d and 12d, respectively. Thus, a composite vibration of the longitudinal vibration and the bending vibration is caused in each of the frame side portions 11b and 11d, so that the elliptic motion toward the Y direction is generated at the tip ends of the driving force extracting members 14a to 14d and the tip ends of the driving force extracting members 14b and 14c.

These controlling methods (1) and (2) are conducted independently of each other, but may be conducted simultaneously. If these controlling methods are conducted independently of each other, the vibration actuator is moved in the X direction and the Y direction independently, and if these methods are conducted simultaneously, the vibration actuator is moved in the synthesized direction of the X direction and the Y direction.

FIG. 4 is a block diagram for showing application of the driving voltage onto the adjacent two piezoelectric elements 12a and 13a.

Referring to FIG. 4, an oscillator 20 functions to apply the high-frequency voltages A and B to the piezoelectric elements 12a to 12d and 13a to 13d. An output therefrom is branched into two. One is, after being phase-shifted only by $\pi/2$ in time by an X-directional phase shifter 21X and a Y-directional phase shifter 21Y, connected to an X-directional amplifier 22X and a Y-directional amplifier 22Y. The other is directly connected to an X-directional amplifier 23X and a Y-directional amplifier 23Y.

The amplifiers 22X, 22Y, 23X and 23Y are connected to the piezoelectric elements 12a to 12d and 13a to 13d, respectively, through change-over switches 26a, 26b, 26c and 26d. It is noted that all of the change-over switches 26a to 26d are normally in a turned-on state.

(1) When the switch 24 is connected to an upper part, as shown in FIG. 4, the high-frequency voltages A and B are applied onto the piezoelectric elements 12a and 13c and the piezoelectric elements 13a and 12c, respectively, so that the vibration actuator 10 translates both in the +X and −X directions.

(2) When the switch 24 is connected to a lower part, the high-frequency voltages A and B are applied onto the piezoelectric elements 13a and 13c and the piezoelectric elements 12a and 12c, respectively, so that the vibration actuator 10 rotates around the central portion of the elastic member 11.

(3) When the switch 25 is connected to an upper part, as shown in FIG. 4, the high-frequency voltages A and B are applied onto the piezoelectric elements 13b and 12d and the piezoelectric elements 12b and 13d, respectively, so that the vibration actuator 10 translates both in the +Y and −Y directions.

(4) When the switch 25 is connected to a lower part, the high-frequency voltages A and B are applied onto the piezoelectric elements 13b and 13d and the piezoelectric elements 12b and 12d, respectively, so that the vibration actuator 10 rotates around the central portion of the elastic member 11.

Note that it is possible to apply the driving voltage only onto one of the opposed frame side portions 11a and 11c, and 11b and 11d by turning the change-over switches 26a to 26d off. In this connection, even if the case is the above-mentioned (1) or (3), a rotatory power works upon the elastic member 11.

As described above, the basic arrangement of the present embodiment is that the driving voltage is applied so as to move the opposed piezoelectric elements in the same direction and the vibration actuator translates in one or both of the X and Y directions. However, it is possible to rotate, not to translate, the vibration actuator by applying the driving voltage in such a manner as to move the opposed piezoelectric elements in the directions opposite to each other.
(Second Embodiment)

Figure 5:
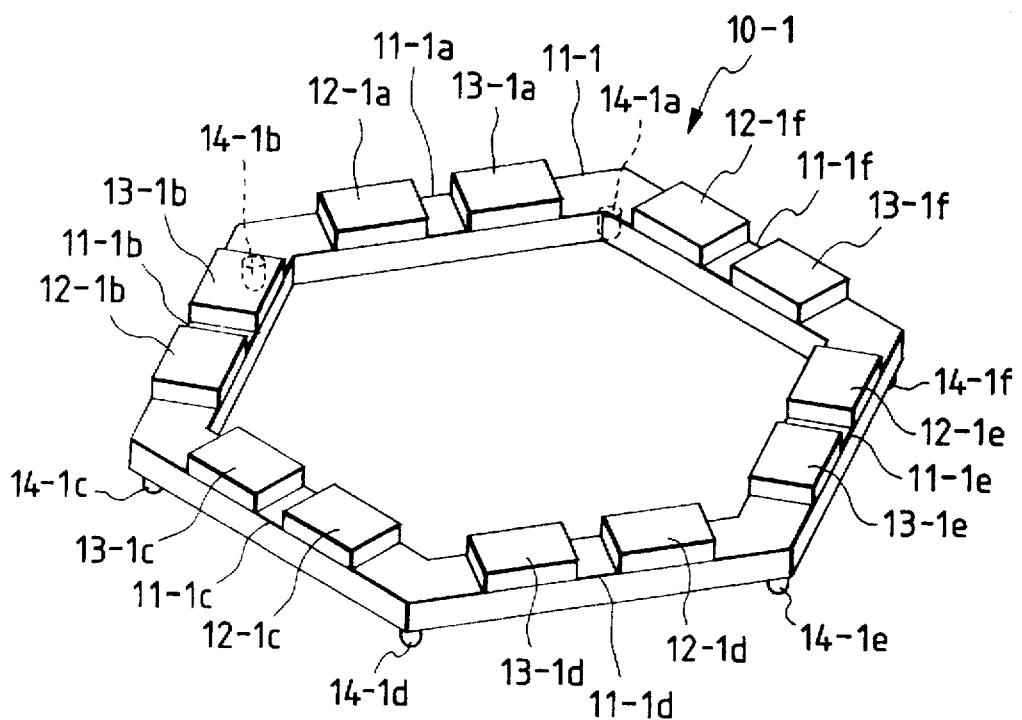
FIG. 5 is a perspective view showing the whole constitution of a vibration actuator according to a second embodiment of the present invention.

FIG. 5 is a perspective view showing the second embodiment of a vibration actuator according to the present invention.

A vibration actuator 10-1 of the present embodiment is constituted by an elastic member 11-1 which presents a frame shape having an outer form of a regular hexagon, piezoelectric elements 12-1a and 13-1a, 12-1b and 13-1b, 12-1c and 13-1c, 12-1d and 13-1d, 12-1e and 13-1e, and 12-1f and 13-1f which functions as electro-mechanical converting elements to be joined to the six frame side portions 11-1a, 11-1b, 11-1c, 11-1d, 11-1e and 11-1f of this elastic member 11-1, and driving force extracting members 14-1a, 14-1b, 14-1c, 14-1d, 14-1e and 14-1f which are disposed in the vicinities of the six apexes of the elastic member 11-1.

As described above, the outer form of the elastic member is made polygonal so that the number of directions for installing the piezoelectric elements provided in the frame side portions of this elastic member is increased. For this reason, it is possible to increase the number of directions for moving the vibration actuator.

Arrangements other than this are entirely the same as those in the foregoing first embodiment so that more detailed description will be omitted.
(Modifications)

A vibration actuator according to the present invention is not limited to those in the first and second embodiments fully described above. Various modifications and alterations are possible and they are also included in the present invention.

For example, the outer form of the frame-like elastic member is not limited to a regular square in the first embodiment or a regular hexagon in the second embodiment, but may be a polygon which has at least one pair of parallel or substantially parallel sides opposite to each other. It may be, for example, a trapezium, a rectangle, a regular octagon, or the like.

Though in the present embodiment, piezoelectric elements are used as electro-mechanical converting elements. However, it is possible to use electrostriction elements, magnetostriction elements, or the like.

Further, it is possible to use the vibration actuator of the present invention as a driving unit for an XY stage in a microscope, a driving unit for a feeding device of plotter sheets, and the like, in addition to as a driving unit for a vibration compensating apparatus.

What is claimed is:

1. A vibration actuator comprising:
   an elastic member forming a frame having a polygonal outer form;
   a plurality of electro-mechanical converting elements joined to one side of said frame of said elastic member; and
   a control system which applies a drive signal to the plurality of electro-mechanical converting elements to cause elliptic movement at predetermined positions in said frame by generating vibrations in a longitudinal vibration mode and a bending vibration mode in only said one side.

2. A vibration actuator according to claim 1, wherein driving force extracting members are provided at said predetermined positions in said frame.

3. A vibration actuator according to claim 2, wherein each of said driving force extracting members has a curved-face portion to be contacted to a relative moving member.

4. A vibration actuator according to claim 1, wherein said polygonal outer form is a regular square and said predetermined positions are in the vicinities of the apexes of the regular square.

5. A vibration actuator according to claim 1, wherein said polygonal outer form is a regular hexagon and said predetermined positions are in the vicinities of the apexes of the regular hexagon.

6. A vibration actuator comprising:
   an elastic member forming a frame having a polygonal outer form with a pair of parallel or substantially parallel sides;
   a plurality of electro-mechanical converting elements joined to each side of said pair of sides, which generate elliptic motion at predetermined positions in said frame by generating vibrations in a longitudinal vibration mode and a bending vibration mode; and
   a control system which provides elliptic movement and which provides movement in a direction substantially parallel to said pair of sides by controlling driving of electro-mechanical converting elements of said plurality to generate the vibration modes.

7. A vibration actuator according to claim 6, wherein said electro-mechanical converting elements joined to one of said pair of sides are controlled independently of said electro-mechanical converting elements joined to the other of said pair of sides.

8. A vibration actuator according to claim 7, wherein driving force extracting members are provided at said predetermined positions in said frame.

9. A vibration actuator according to claim 6, wherein said control system includes a plurality of independently operable switches which selectively control driving of electro-mechanical converting elements of said plurality.

10. A vibration actuator according to claim 6, wherein said control system selectively controls driving of electro-mechanical converting elements of said plurality that are joined to only one side of said pair of sides or to both of said pair of sides.

11. A vibration actuator according to claim 6, further comprising:
    a source of driving voltages which provides a first driving voltage and a second driving voltage phase shifted from said first driving voltage, wherein said control system is constructed to apply said first and second driving voltages selectively to predetermined electro-mechanical converting elements of said plurality.

12. A vibration actuator according to claim 6, wherein said control system selectively controls driving of electro-mechanical converting elements of said plurality to provide one or the other of said elliptical movement and said movement in a direction substantially parallel to said pair of sides.

13. A vibration actuator according to claim 6, wherein said vibration actuator surrounds a lens barrel of a camera for adjusting an operation of said lens barrel.

14. A vibration actuator comprising:
    an elastic member forming a frame having a polygonal outer form with a pair of parallel or substantially parallel sides;
    a plurality of electro-mechanical converting elements joined to each side of said pair of sides, which generate elliptic motion at predetermined positions in said frame by generating vibrations in a longitudinal vibration mode and a bending vibration mode; and
    means, including a control system, which provides elliptic movement and which provides movement in a direction substantially parallel to said pair of sides by controlling driving of electro-mechanical converting elements of said plurality to generate the vibration modes.

15. A vibration actuator according to claim 14, wherein said electro-mechanical converting elements joined to one of said pair of sides are controlled independently of said electro-mechanical converting elements joined to the other of said pair of sides.

16. A vibration actuator according to claim 15, wherein driving force extracting members are provided at said predetermined positions in said frame.

17. A vibration actuator according to claim 14, wherein said control system includes a plurality of independently operable switches which selectively control driving of electro-mechanical converting elements of said plurality.

18. A vibration actuator according to claim 14, wherein said control system selectively controls driving of electro-mechanical converting elements of said plurality that are joined to only one side of said pair of sides or to both of said pair of sides.

19. A vibration actuator according to claim 14, further comprising:

a source of driving voltages which provides a first driving voltage and a second driving voltage phase shifted from said first driving voltage, wherein said control system is constructed to apply said first and second driving voltages selectively to predetermined electro-mechanical converting elements of said plurality.

20. A vibration actuator according to claim 14, wherein said control system selectively controls driving of electro-mechanical converting elements of said plurality to provide one or the other of said elliptical movement and said movement in a direction substantially parallel to said pair of sides.

21. A vibration actuator according to claim 14, wherein said vibration actuator surrounds a lens barrel of a camera for adjusting an operation of said lens barrel.

* * * * *